US012790522B2

(12) United States Patent
Fujiwara

(10) Patent No.: US 12,790,522 B2
(45) Date of Patent: Nov. 10, 2026

(54) RESIN COMPOSITION, ADHESIVE MEMBER, AND DISPLAY DEVICE INCLUDING THE ADHESIVE MEMBER

(71) Applicant: Samsung Display Co., Ltd., Yongin-si (KR)

(72) Inventor: Tetsuya Fujiwara, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 275 days.

(21) Appl. No.: 18/588,381

(22) Filed: Feb. 27, 2024

(65) Prior Publication Data

US 2024/0301254 A1 Sep. 12, 2024

(30) Foreign Application Priority Data

Mar. 9, 2023 (KR) ........................ 10-2023-0031368

(51) Int. Cl.

| | |
|---|---|
| ***C09J 133/14*** | (2006.01) |
| ***C08F 20/32*** | (2006.01) |
| ***C08F 20/36*** | (2006.01) |
| ***C08F 224/00*** | (2006.01) |
| ***C09J 7/30*** | (2018.01) |
| ***C09J 11/06*** | (2006.01) |

(52) U.S. Cl.

CPC ............. *C09J 133/14* (2013.01); *C08F 20/32* (2013.01); *C08F 20/36* (2013.01); *C08F 224/00* (2013.01); *C09J 7/30* (2018.01); *C09J 11/06* (2013.01)

(58) Field of Classification Search

None

See application file for complete search history.

(56) References Cited

U.S. PATENT DOCUMENTS

| | | | | |
|---|---|---|---|---|
| 11,404,617 | B2 | 8/2022 | Hayashi et al. | |
| 2021/0132274 | A1 | 5/2021 | Saito | |
| 2022/0145129 | A1 * | 5/2022 | Lee | C08G 77/18 |

FOREIGN PATENT DOCUMENTS

| | | |
|---|---|---|
| JP | 2013-254189 | 12/2013 |
| JP | 2017-210578 | 11/2017 |
| JP | 2019-61323 | 4/2019 |
| JP | 6539488 | 7/2019 |
| JP | 6623121 | 12/2019 |
| KR | 10-2021-0085209 | 7/2021 |
| KR | 10-2509342 | 3/2023 |
| WO | 2018/190415 | 3/2020 |

* cited by examiner

*Primary Examiner* — Sheeba Ahmed

(74) *Attorney, Agent, or Firm* — Sughrue Mion, PLLC

(57) ABSTRACT

Embodiments provide a resin composition, an adhesive member, and a display device. The resin composition includes a urethane (meth)acrylate oligomer, a first monomer, and a second monomer, wherein an amount of the urethane (meth)acrylate oligomer is in a range of about 5 wt % to about 20 wt % based on a total weight of the resin composition, an amount of the second monomer is in a range of about 10 wt % to about 30 wt % based on a total weight of the resin composition, and a total amount of the urethane (meth)acrylate oligomer and the first monomer is in a range of about 50 wt % to about 80 wt % based on a total weight of the resin composition.

19 Claims, 8 Drawing Sheets

RESIN COMPOSITION, ADHESIVE MEMBER, AND DISPLAY DEVICE INCLUDING THE ADHESIVE MEMBER

CROSS-REFERENCE TO RELATED APPLICATION(S)

This application claims priority to and benefits of Korean Patent Application No. 10-2023-0031368 under 35 U.S.C. § 119, filed on Mar. 9, 2023, in the Korean Intellectual Property Office, the entire contents of which are incorporated herein by reference.

BACKGROUND

1. Technical Field

The disclosure relates to a resin composition, an adhesive member formed from the resin composition, and a display device including the adhesive member.

2. Description of the Related Art

Display devices are used in various multimedia devices such as televisions, cellular phones, tablet computers, and game consoles to provide image information to users. Current development is directed to various flexible display devices which are capable of folding, bending, or rolling. Flexible display devices are required to have proven reliability in being folded, bent, or rolled.

A display device is composed of multiple members, and includes an adhesive layer for attaching the members together. The adhesive layer may be applied in various shapes of display devices, and may be formed of a resin composition. The resin composition is required to have excellent coatability with respect to the members of the various display devices.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition having excellent discharge stability and excellent adhesion strength.

The disclosure also provides an adhesive member having excellent adhesion strength.

The disclosure also provides a display device including an adhesive member having excellent adhesion strength, and thus having excellent reliability in various operation states.

An embodiment provides a resin composition which may include a urethane (meth)acrylate oligomer including two or more (meth)acryloyl groups, a first monomer not including a cationic polymerizable group but including one (meth) acryloyl group per monomer unit, and a second monomer including one (meth)acryloyl group and one cationic polymerizable group per monomer unit. An amount of the urethane (meth)acrylate oligomer may be in a range of about 5 wt % to about 20 wt %, based on a total weight of the resin composition; an amount of the second monomer may be in a range of about 10 wt % to about 30 wt %, based on a total weight of the resin composition; and a total amount of the urethane (meth)acrylate oligomer and the first monomer may be in a range of about 50 wt % to about 80 wt %, based on a total weight of the resin composition.

In an embodiment, the resin composition may further include at least one of a third monomer not including a radical polymerizable group but including one cationic polymerizable group per monomer unit, a photoinitiator, and a photoacid generator.

In an embodiment, a weight-average molecular weight of the third monomer may be in a range of about 150 g/mol to about 300 g/mol.

In an embodiment, the photoinitiator may include a radical polymerization initiator.

In an embodiment, the photoacid generator may include a sulfonium salt.

In an embodiment, the resin composition may further include the third monomer, the photoinitiator, and the photoacid generator; and an amount of the third monomer may be in a range of about 10 wt % to about 20 wt %, based on a total weight of the resin composition.

In an embodiment, a weight-average molecular weight of the urethane (meth)acrylate oligomer may be in a range of about 10,000 g/mol to about 40,000 g/mol.

In an embodiment, a viscosity of the resin composition at about 30° C. may be in a range of about 5 mPa·s to about 20 mPa·s.

In an embodiment, a weight-average molecular weight of the first monomer and a weight-average molecular weight of the second monomer may each independently be in a range of about 150 g/mol to about 300 g/mol.

In an embodiment, the urethane (meth)acrylate oligomer may include two to four (meth)acryloyl groups.

In an embodiment, a 180° peel strength of the cured resin composition may be equal to or greater than about 400 gf/25 mm, with respect to each of a polyethylene terephthalate (PET) film and a glass substrate at about 25° C., immediately after photocuring in the presence of oxygen.

In an embodiment, the resin composition may not include an organic solvent.

An embodiment provides an adhesive member which may include a polymer derived from a resin composition. The resin composition may include: a urethane (meth)acrylate oligomer including two or more (meth)acryloyl groups; a first monomer not including a cationic polymerizable group but including one (meth)acryloyl group per monomer unit; and a second monomer including one (meth)acryloyl group and one cationic polymerizable group per monomer unit. A total amount of the urethane (meth)acrylate oligomer and the first monomer may be in a range of about 50 wt % to about 80 wt %, based on a total weight of the resin composition; and a peel strength time change ratio according to Equation 1, which is explained below, may be equal to or greater than about 100%.

In an embodiment, an amount of the urethane (meth) acrylate oligomer may be in a range of about 5 wt % to about 20 wt %, based on a total weight of the resin composition.

In an embodiment, an amount of the second monomer may be in a range of about 10 wt % to about 30 wt %, based on a total weight of the resin composition.

In an embodiment, the resin composition may further include: a third monomer not including a radical polymerizable group but including one cationic polymerizable group per monomer unit; a photoinitiator; and a photoacid generator.

In an embodiment, P1 may be equal to or greater than about 400 gf/25 mm.

An embodiment provides a display device which may include a display panel, a window disposed on the display panel, and an adhesive member disposed between the display panel and the window and including a polymer derived from a resin composition. The resin composition may include: a urethane (meth)acrylate oligomer including two or more (meth)acryloyl groups; a first monomer not including a cationic polymerizable group but including one (meth) acryloyl group per monomer unit; a second monomer including one (meth)acryloyl group and one cationic polymerizable group per monomer unit; a third monomer not including a radical polymerizable group but including one cationic polymerizable group per monomer unit; a photoinitiator; and a photoacid generator. An amount of urethane (meth)acrylate oligomer may be in a range of about 5 wt % to about 20 wt %, based on a total weight of the resin composition; an amount of the second monomer may be in a range of about 10 wt % to about 30 wt %, based on a total weight of the resin composition; and a total amount of the urethane (meth)acrylate oligomer and the first monomer may be in a range of about 50 wt % to about 80 wt %, based on a total weight of the resin composition.

In an embodiment, the adhesive member may have a peel strength time change ratio according to Equation 1, which is explained below, equal to or greater than about 100%.

In an embodiment, the display device may further include a light controlling layer disposed between the adhesive member and the window, and an optical adhesive layer disposed between the light controlling layer and the window, wherein the optical adhesive layer may include a polymer derived from the resin composition.

It is to be understood that the embodiments above are described in a generic and explanatory sense only and not for the purposes of limitation, and the disclosure is not limited to the embodiments described above.

BRIEF DESCRIPTION OF THE DRAWINGS

The accompanying drawings are included to provide a further understanding of the embodiments, and are incorporated in and constitute a part of this specification. The above and other aspects and features of the disclosure will become more apparent by describing in detail embodiments thereof with reference to the accompanying drawings, in which.

DETAILED DESCRIPTION OF THE EMBODIMENTS

Figure 1:
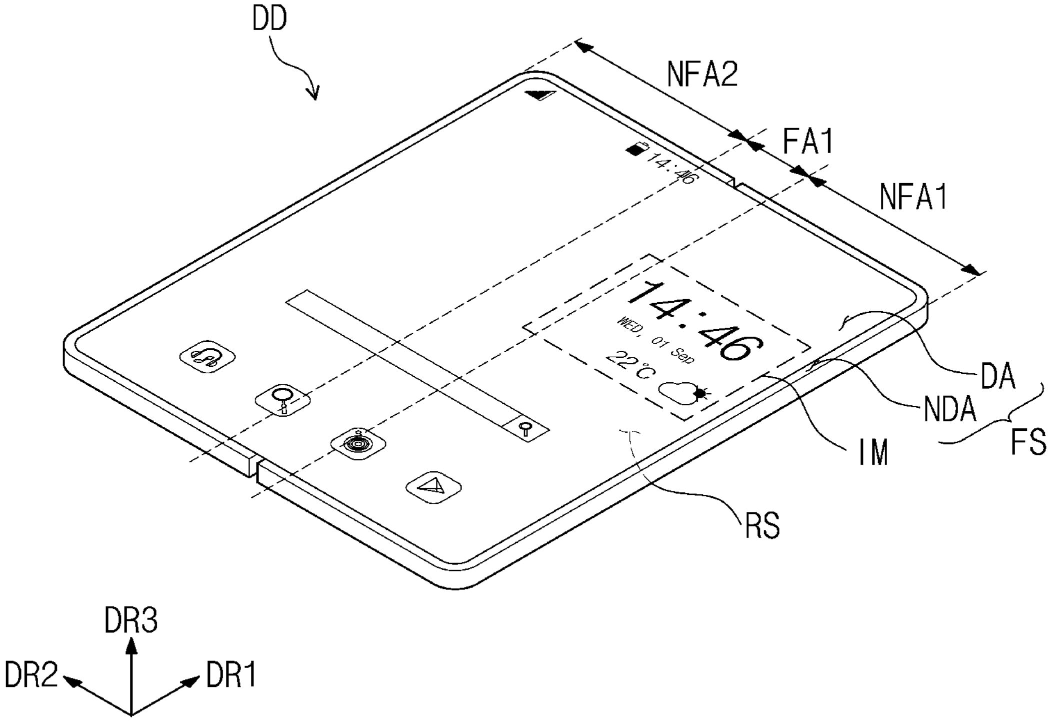
FIG. 1 is a schematic perspective view of a display device in an unfolding state according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like reference numbers and reference characters refer to like elements throughout.

In the specification, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the specification, when an element is "directly on," "directly connected to," or "directly coupled to" another element, there are no intervening elements present. For example, "directly on" may mean that two layers or two elements are disposed without an additional element such as an adhesion element therebetween.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

In the specification and the claims, the term "at least one of" is intended to include the meaning of "at least one selected from the group consisting of" for the purpose of its meaning and interpretation. For example, "at least one of A, B, and C" may be understood to mean A only, B only, C only, or any combination of two or more of A, B, and C, such as ABC, ACC, BC, or CC. When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within ±20%, ±10%, or ±5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a display device according to an embodiment and a method of manufacturing a display device will be explained referring to the drawings.

Figure 2A:
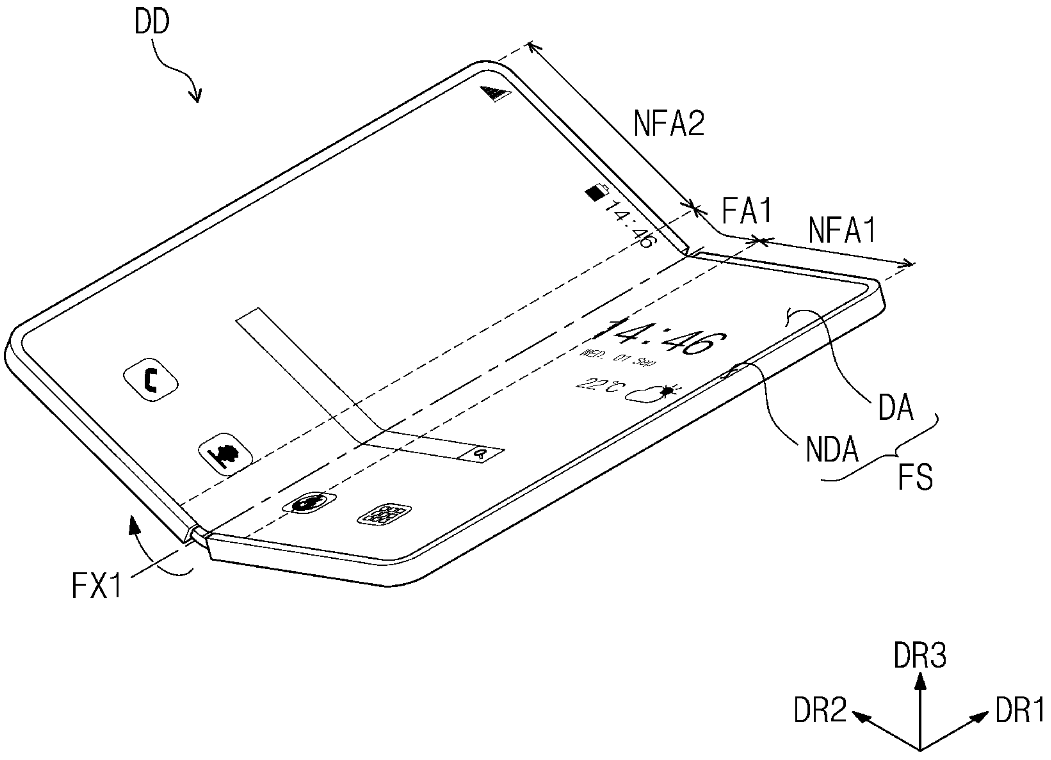
FIG. 2A is a schematic perspective view of a display device during an inward folding process according to an embodiment.
Figure 2B:
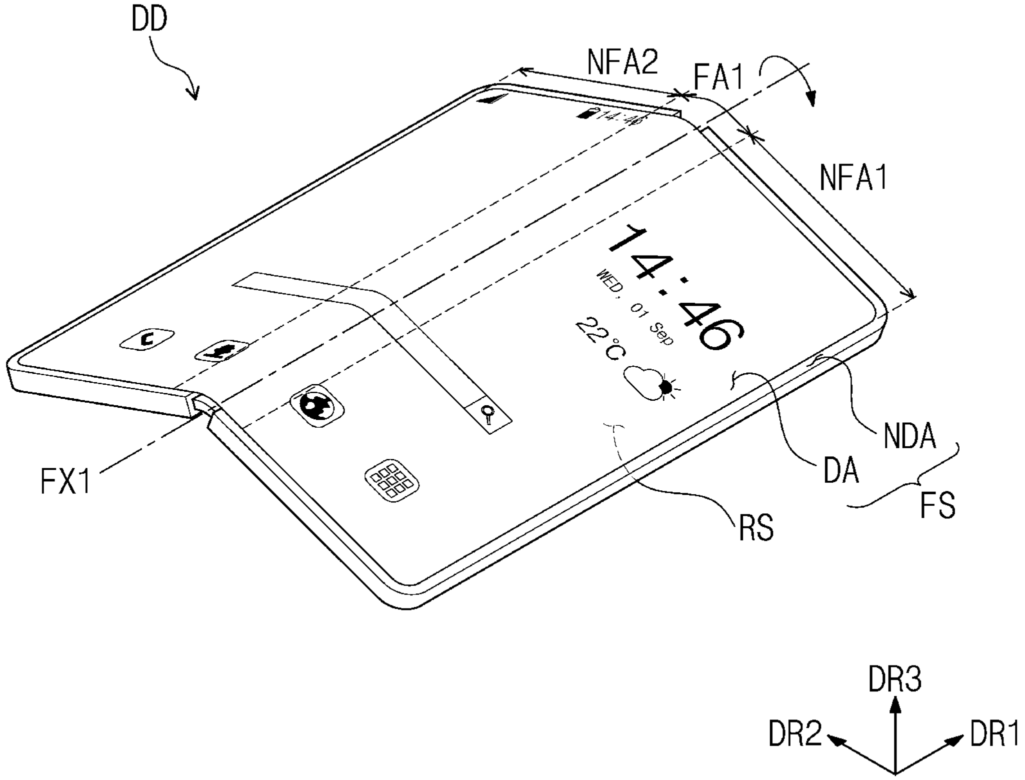
FIG. 2B is a schematic perspective view of a display device during an outward folding process according to an embodiment.

FIG. 1 is a schematic perspective view of a display device DD in an unfolding state according to an embodiment. FIG. 2A is a schematic perspective view of a display device DD during an inward folding process according to an embodiment. FIG. 2B is a schematic perspective view of a display device DD during an outward folding process according to an embodiment.

A display device DD according to an embodiment shown in FIG. 1 may be a device activated according to electrical signals. For example, the display device DD may be a cellular phone, a tablet, a monitor, a television, a car navigation device, a game console, or a wearable device, but embodiments are not limited thereto. FIG. 1 illustrates a cellular phone as an example of the display device DD. The display device DD according to an embodiment may be a flexible display device DD which is capable of folding, bending, or rolling.

FIG. 1 and the drawings below show a first direction DR1, a second direction DR2, and a third direction DR3. The directions indicated by the first direction DR1, the second direction DR2, and the third direction DR3, explained in the specification have relative terms and may be converted into other directions. In the specification, the first direction DR1 and the second direction DR2 may be orthogonal to each other, and the third direction DR3 may be a normal direction with respect to a plane defined by the first direction DR1 and the second direction DR2.

In the specification, the display device DD may have a thickness direction that is parallel to the third direction DR3, which is a normal direction with respect to a plane defined by the first direction DR1 and the second direction DR2. A front surface (or top surface) and the rear surface (or bottom surface) of the members constituting the display device DD may be defined based on the third direction DR3.

In the specification, "in a plan view" may be interpreted as viewing in a plane which is parallel to a plane defined by the first direction DR1 and the second direction DR2. In the specification, "overlap" may be interpreted as overlapping in a plan view, unless otherwise specifically defined.

Referring to FIG. 1, the display device DD may display images IM through a display surface FS. The display surface FS may include a display area DA and a non-display area NDA. The display area DA may be an area that is activated by electrical signals. The display device DD may display images IM through a display area DA. The display area DA may detect various types of external pressure. The non-display area NDA may be adjacent to the display area DA. The non-display area NDA may surround the display area DA. Accordingly, the shape of the display area DA may substantially be defined by the non-display area NDA. However, this is only an example. In an embodiment, the non-display area NDA may be disposed adjacent to only one side of the display area DA, or the non-display area NDA may be omitted. The display surface FS may include a plane that is defined by the first direction DR1 and the second direction DR2.

The rear surface RS of the display device DD may be a surface that is oppositely disposed to the display surface FS. For example, the rear surface RS may be an external surface of the display device DD and may not display videos or images. In another embodiment, the rear surface RS may play the role of a second display surface displaying videos or images.

The display device DD may be divided into a folding area FA1 and non-folding areas NFA1 and NFA2. Multiple non-folding areas NFA1 and NFA2 may be defined. A first non-folding area NFA1 and a second non-folding area NFA2 may be separated with the folding area FA1 therebetween.

Referring to FIG. 1 to FIG. 2B, a display device DD is shown to include one folding area FA1, but this is only an example, and multiple folding areas may be defined in the display device DD. In an embodiment, the display device DD may be folded with respect to multiple folding axes, so that portions of the display surface FS may face each other. The number of the folding axes and the resulting number of the non-folding areas included in the display device DD are not limited to any one embodiment.

Referring to FIG. 2A and FIG. 2B, the display device DD may be folded based on a first folding axis FX1. The first folding axis FX1 shown in FIG. 2A and FIG. 2B may be an imaginary axis extended in the first direction DR1, and the first folding axis FX1 may be in parallel to the longitudinal direction of the display device DD. However, this is only an example, and the direction in which the first folding axis FX1 extends is not limited to the first direction DR1.

The first folding axis FX1 may extend along the first direction DR1 on the display surface FS, or may extend along the first direction DR1 on the rear surface RS. Referring to FIG. 2A, a first non-folding area NFA1 and a second non-folding area NFA2 may face each other and may be folded inward so that the display surface FS is not exposed to the outside. Referring to FIG. 2B, the display device DD may be folded based on the first folding axis FX1 into an outward-folded state in which an area of the rear surface RS that overlaps the first non-folding area NFA1 and another area of the rear surface RS that overlaps the second non-folding area NFA2 may face to each other.

Figure 3:
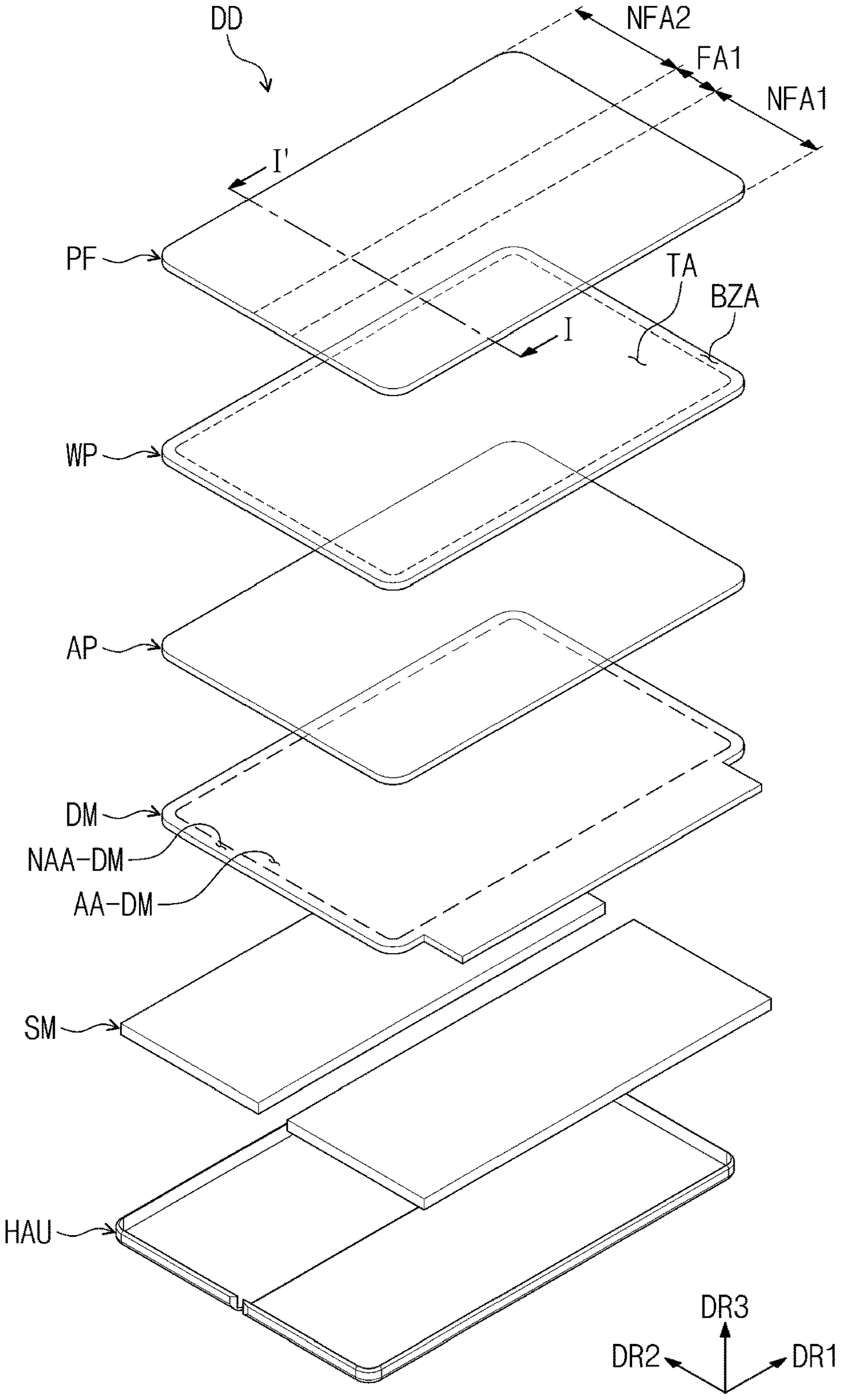
FIG. 3 is an exploded schematic perspective view of a display device according to an embodiment.

FIG. 3 is an exploded schematic perspective view of a display device DD according to an embodiment.

Referring to FIG. 3, the display device DD includes a display module DM, a window WP disposed on the display module DM, and an adhesive member AP disposed between the display module DM and the window WP. The display device DD may further include a support member SM disposed on a lower portion of the display module DM, a protection layer PF disposed on the window WP, and a housing HAU receiving the display module DM, the support member SM, or the like.

The housing HAU may include a material having relatively high rigidity. For example, the housing HAU may include frames and/or plates composed of glass, plastics, or metals. The housing HAU may provide an accommodating space to receive various components of the display device DD. The display module DM may be received in the accommodating space for protection from external impact.

The support member SM may include a metal material and a polymer material. For example, the support member SM may include stainless steel, aluminum, or alloys thereof. As another example, the support member SM may include carbon fiber reinforced plastic (CFRP), or the like. However, embodiments are not limited thereto, and the support member SM may include a nonmetal material, plastic, glass fiber reinforced plastic, or glass.

Although not shown in drawings, the display device DD may further include a cushion layer, a shield layer, or the like that is disposed under the support member SM. The cushion layer may include elastomer such as a sponge, a foam, and a urethane resin. The shield layer may be an electromagnetic wave shield layer or a heat dissipating layer.

The display module DM may be activated by electrical signals. The display module DM may be activated to display an image IM (FIG. 1) on the display area DA (FIG. 1) of the display device DD. An active area AA-DM and a surrounding area NAA-DM may be defined in the display module DM. The active area AA-DM may be an area that is activated by electrical signals. The surrounding area NAA-DM may be an area that is adjacent to at least one side of the active area AA-DM. In the surrounding area NAA-DM, circuits or wirings for driving the active area AA-DM may be disposed.

An adhesive member AP may be disposed on the display module DM. The display module DM and the window WP may be combined by the adhesive member AP. The adhesive member AP may be optically clear. The adhesive member AP according to an embodiment may include a polymer derived from a resin composition according to an embodiment. The adhesive member AP according to an embodiment may be formed from the resin composition according to an embodiment. The adhesive member AP formed from the resin composition according to an embodiment may show excellent adhesion reliability. In an embodiment, the display device DD including the adhesive member AP formed from the resin composition may show excellent reliability in an operating state such as folding, bending, and rolling.

The window WP may include a glass substrate. The window WP may protect the display module DM or the like. An image IM (FIG. 1) that is produced at the display module DM may pass through the window WP and may be provided to users. For example, the window WP may include ultra-thin glass (UTG).

The window WP may include a transmission area TA and a bezel area BZA. The transmission area TA may be overlapped with at least a portion of the active area AA-DM of the display module DM. The transmission area TA may be an optically transparent area. An image IM (FIG. 1) may be provided through the transmission area TA to users.

The bezel area BZA may have a light transmittance that is relatively lower than that of the transmission area TA. The bezel area BZA may define a shape of the transmission area TA. The bezel area BZA may be adjacent to the transmission area TA, and may surround the transmission area TA.

The bezel area BZA may have a selected color. The bezel area BZA may cover the surrounding area NAA-DM of the display module DM and block the surrounding area NAA-DM from being recognized by the outside. However, embodiments are not limited thereto, and the bezel area BZA may be disposed adjacent to only one side of the transmission area TA, or at least a portion thereof may be omitted.

The protection layer PF may be a functional layer that protects a surface (for example, top surface) of the window WP. The protection layer PF may include a fingerprint preventing coating material, a hard coating material, an antistatic material, or the like. Although not shown in the drawings, an auxiliary adhesive layer may be disposed between the window WP and the protection layer PF. Although not shown in FIG. 3, in an embodiment, the protection layer PF may be omitted.

Figure 4:
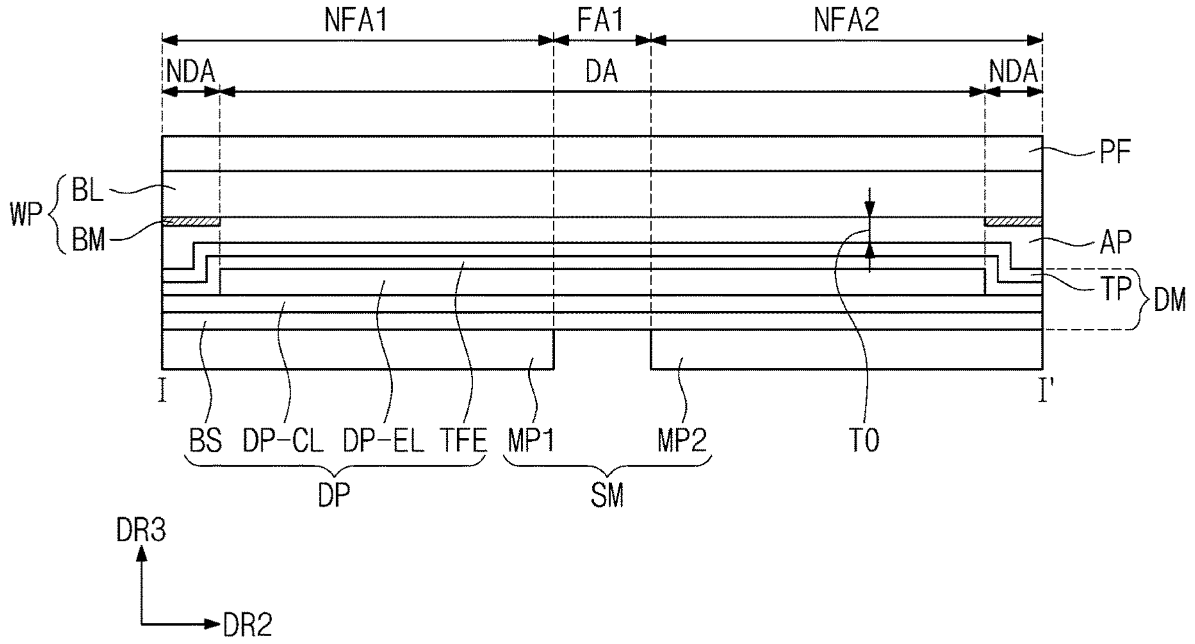
FIG. 4 is a schematic cross-sectional view of a display device according to an embodiment.

FIG. 4 is a schematic cross-sectional view of a display device DD according to an embodiment. FIG. 4 may be a schematic cross-sectional view of a part corresponding to line I-I' in FIG. 3.

FIG. 4 shows a support member SM, a display module DM, an adhesive member AP, a window WP, and a protection layer PF, with the housing HAU omitted, for convenience of description.

Referring to FIG. 4, the support member SM may include a first support part MP1 that overlaps the first non-folding area NFA1 and a second support part MP2 that overlaps the second non-folding area NFA2. The first support part MP1 and the second support part MP2 may be separated from the folding area FA1. The first support part MP1 and the second support part MP2 may not overlap the folding area FA1. Although not shown in FIG. 4, in an embodiment, at least a portion of the first support part MP1 and at least a portion of the second support part MP2 may overlap with the folding area FA1.

The display module DM may include a display panel DP and an input sensing part TP that is disposed on the display panel DP. The display panel DP may include a base substrate BS, a circuit layer DP-CL disposed on the base substrate BS, a display element layer DP-EL disposed on the circuit layer DP-CL, and an encapsulation layer TFE disposed on and covering the display element layer DP-EL.

The configuration of the display panel DP, shown in FIG. 4 is only an example, and the configuration of the display panel DP is not limited thereto. For example, the display panel DP may include a liquid crystal display element, and the encapsulation layer TFE may be omitted.

The base substrate BS may provide a base surface on which the circuit layer DP-CL is disposed. The base substrate BS may be a flexible substrate that is bending, folding, rolling, or the like. The base substrate BS may be a glass substrate, a metal substrate, or a polymer substrate. However, embodiments are not limited thereto, and the base substrate BS may include an inorganic layer, an organic layer, or a composite material layer.

The circuit layer DP-CL may include an insulating layer, a semiconductor pattern, a conductive pattern, and a signal line. For example, the circuit layer DP-CL may include a switching transistor and a driving transistor for driving the light emitting elements (not shown) in the display element layer DP-EL.

The display element layer DP-EL may include a light emitting element that emits light (not shown). For example, the light emitting element may be an organic light emitting element, an inorganic light emitting element, an organic-inorganic light emitting element, a micro light emitting diode (LED), a nano LED, a quantum dot light emitting element, an electrophoretic element, or an electrowetting element.

The encapsulation layer TFE may be disposed on the display element layer DP-EL. The encapsulation layer TFE may protect the display element layer DP-EL from foreign materials such as humidity, oxygen, and/or dust particles. The encapsulation layer TFE may include at least one inorganic layer. In an embodiment, the encapsulation layer TFE may include at least one organic layer and at least one inorganic layer. For example, the encapsulation layer TFE may include an inorganic layer, an organic layer, and another inorganic layer, which may be laminated in this order, but embodiments are not limited thereto.

The input sensing part TP may be disposed on the display panel DP. For example, the input sensing part TP may be disposed directly on the encapsulation layer TFE of the display panel DP. The input sensing part TP may sense an external pressure to change into an input signal and provide the display panel DP with the input signal. For example, in the display device DD according to an embodiment, the input sensing part TP may be a touch sensing part sensing a touch. The input sensing part TP may recognize the direct touch of a user, the indirect touch of a user, the direct touch of an object, the indirect touch of an object, or the like.

The input sensing part TP may sense at least one of a position of an externally applied touch and a force (pressure) of an externally applied touch. In an embodiment, the input sensing part TP may include various structures or may be constituted using various materials, but embodiments are not limited thereto. The input sensing part TP may include sensing electrodes (not shown) for sensing an external input. The sensing electrodes (not shown) may sense an external input in an electrostatic capacitance manner. The display panel DP may receive input signals from the input sensing part TP and may produce images corresponding to the input signals.

The window WP may include a base layer BL and a printed layer BM. In an embodiment, the base layer BL may be a glass substrate. In another embodiment, the base layer BL may be a plastic substrate or a polymer substrate. For example, the base layer BL may include polyimide, polyacrylate, polymethylmethacrylate, polycarbonate, polyethylene naphthalate, polyvinylidene chloride, polyvinylidene difluoride, polystyrene, an ethylene-vinyl alcohol copolymer, or combinations thereof.

The printed layer BM may be disposed on a surface of the base layer BL. The printed layer BM may be provided on at least one portion of a bottom surface of the base layer BL that is adjacent to the display module DM. The print layer BM may be disposed at an edge area of the base layer BL. The printed layer BM may be an ink printed layer. The printed layer BM may be a layer that includes a pigment or a dye. In the window WP, the bezel area BZA may be a portion where the printed layer BM is provided.

An adhesive member AP may be disposed between the display module DM and the window WP. A thickness TO of the adhesive member AP may be in a range of about 50 μm to about 200 μm. For example, the thickness TO of the adhesive member AP may be in a range of about 50 μm to about 100 μm. However, this is only an example, and the thickness TO of the adhesive member AP is not limited thereto.

In the window WP, there may be a step between the base layer BL not provided with the print layer BM, and the print layer BM. The adhesive member AP may be formed from the resin composition according to an embodiment and may have excellent adhesiveness. Thus, the window WP and the display module DM may be attached without a gap at the step portion.

The adhesive member AP according to an embodiment may be a cured product formed by photocuring the resin composition according to an embodiment. Accordingly, the adhesive member AP may include a polymer derived from the resin composition according to an embodiment. The resin composition according to an embodiment may include a urethane (meth)acrylate oligomer, a first monomer, a second monomer, a third monomer, a photoinitiator, and a photoacid generator. The resin composition according to an embodiment will be explained below.

In an embodiment, the adhesive member AP may have a 180° peel strength equal to or greater than about 400 gf/25 mm, with respect to a glass substrate and a polymer substrate at room temperature. For example, the adhesive member AP formed by photocuring the resin composition may have a 180° peel strength equal to or greater than about 400 gf/25 mm, with respect to a glass substrate and a polyethylene terephthalate (PET) film, at a temperature of about 25° C., immediately after photocuring. The adhesive member AP may show even further improved adhesiveness after the lapse of time. The adhesive member AP formed by photocuring the resin composition may have a 180° peel strength equal to or greater than about 1000 gf/25 mm, with respect to a glass substrate and a polyethylene terephthalate (PET) film, at a temperature of about 25° C., after 1 hour from photocuring.

Since the adhesive member AP according to an embodiment has a high peel strength value, excellent adhesion reliability and excellent folding reliability may be shown. For example, the adhesive member AP formed from the resin composition according to an embodiment may readily fold and unfold without peeling off from an object to be attached (for example, a display module DM and a window WP). Thus, the display device DD including the adhesive member AP according to an embodiment may show excellent reliability in an operation state including folding and unfolding.

Figure 5A:
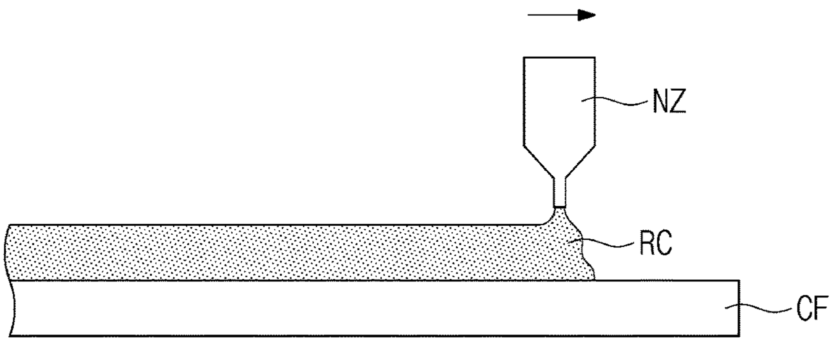
FIG. 5A to FIG. 5C are each a schematic cross-sectional view showing steps of a method for manufacturing an adhesive member according to an embodiment.
Figure 5B:
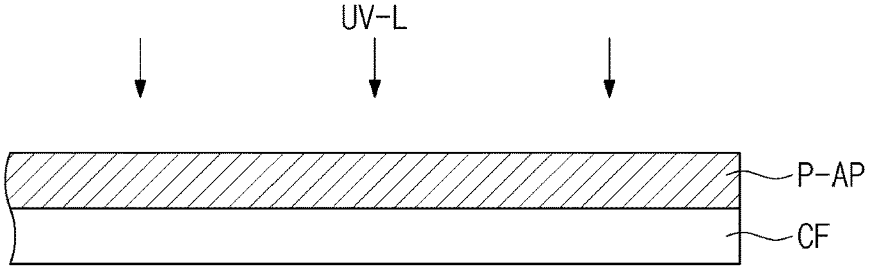
Figure 5C:
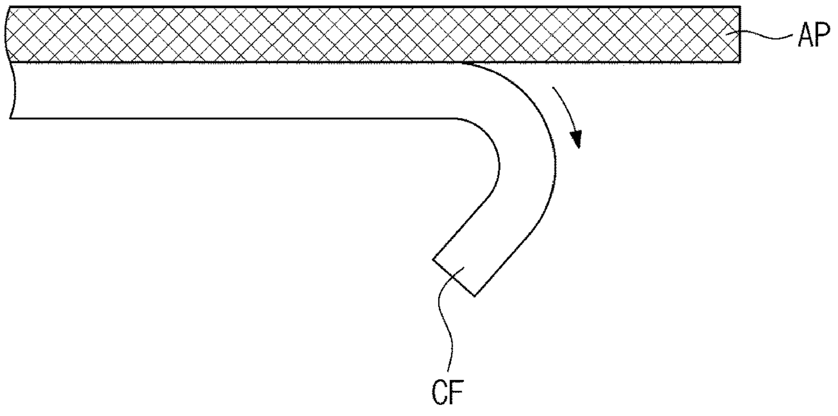

FIG. 5A to FIG. 5C are each a schematic cross-sectional view showing steps of a method for manufacturing an adhesive member AP according to an embodiment.

A method of forming the adhesive member AP according to an embodiment may include a step of providing a resin composition RC on a substrate CF, a step of providing ultraviolet light UV-L to a preliminary adhesive member P-AP to form an adhesive member AP, and a step of detaching the adhesive member AP from the substrate CF.

FIG. 5A is a schematic cross-sectional view illustrating the step of providing the resin composition RC on the substrate CF. Referring to FIG. 5A, the resin composition RC may be applied on the substrate CF. The resin composition RC may be provided on the substrate CF through a nozzle NZ. The substrate CF may be any substrate used for forming the adhesive member AP from the resin composition RC. Accordingly, the substrate CF may be any substrate that may readily detach from the adhesive member AP after curing the resin composition RC, without limitation. A surface of the substrate CF on which the resin composition RC is provided may undergo release treatment.

The resin composition RC may be provided by an inkjet printing method or a dispensing method. The resin composition RC may be provided at a temperature of about 30° C. If the resin composition RC is provided at a temperature of about 30° C., the adhesive member AP according to an embodiment may be readily formed.

The resin composition according to an embodiment may have a viscosity at a temperature of about 30° C. of about 5 mPa·s to about 20 mPa·s. The viscosity is a value measured based on a Japanese Industrial Standard (JIS) K 2283. In an embodiment, the resin composition having a viscosity of less than about 5 mPa·s measured at a temperature of about 30° C. by a JIS K 2283 method, may show flowing during providing the resin composition or may not be applied at a uniform amount and/or at a uniform thickness. The term "flowing" means the flowing phenomenon of a composition deviated from a target member. When the resin composition has a viscosity of equal to or greater than about 20 mPa·s, measured at a temperature of about 30° C. by JIS K 2283, it may not readily discharge and may generate a blockage of a nozzle NZ. Accordingly, the resin composition RC having a viscosity in the above-described range may show excellent discharge stability. Thus, the resin composition RC having the viscosity in the above-described range may be smoothly discharged from a device such as a nozzle NZ and may be applied at a uniform amount and at a uniform thickness, so as not to deviate from a member on which the resin composition RC is to be provided.

In an embodiment, the resin composition RC may show excellent peel strength even photocured in the presence of oxygen. The resin composition RC (for example, the cured resin composition) according to an embodiment may have a 180° peel strength equal to or greater than about 400 gf/25 mm, with respect to a polyethylene terephthalate (PET) film and a glass substrate, at a temperature of about 25° C., immediately after photocuring in the presence of oxygen.

The resin composition RC according to an embodiment is a photocurable resin composition. The resin composition RC according to an embodiment may be an ultraviolet (UV) curable resin that may be cured by ultraviolet light. The resin composition RC according to an embodiment may be a liquid phase before curing, and may be crosslinked or cured under light energy such as ultraviolet light energy.

The resin composition RC according to an embodiment may include a urethane (meth)acrylate oligomer, a first monomer, a second monomer, a third monomer, a photoinitiator, and a photoacid generator.

The resin composition RC may include at least one urethane (meth)acrylate oligomer. The urethane (meth)acrylate oligomer may include two or more (meth)acryloyl groups per an oligomer. The urethane (meth)acrylate oligomer may include two, three, or four (meth)acryloyl groups having a urethane bond per an oligomer unit. The urethane (meth)acrylate oligomer may include an aliphatic urethane acrylate, but, if a glass transition temperature (Tg) is equal to or less than about 0° C., may include an aromatic urethane acrylate. In an embodiment, the urethane (meth)acrylate oligomer may have a polyether skeleton as a polyol, and may have a polyester skeleton and a polycarbonate skeleton. The (meth)acryloyl group may be an acryloyl group or a methacryloyl group.

The resin composition RC according to an embodiment may include one or two or more urethane (meth)acrylate oligomers. For example, the resin composition RC may include at least one among UV-3700B (urethane acrylate, a product of Mitsubishi Chemical Inc.), UV-3300B (urethane acrylate, a product of Mitsubishi Chemical Inc.) and UN-7700 (urethane acrylate, a product of Negami Chemical Industrial Co., Ltd), as the urethane (meth)acrylate oligomer. However, these are only examples, embodiments are not limited thereto.

In an embodiment, the weight-average molecular weight (Mw) of the urethane (meth)acrylate oligomer may be in a range of about 10,000 g/mol to about 40,000 g/mol. The urethane (meth)acrylate oligomer having a weight-average molecular weight equal to or greater than about 10,000 g/mol has an oligomer state having a relatively high degree of polymerization, and if included in the resin composition RC, a high degree of polymerization may be maintained after photocuring. Accordingly, the adhesive member AP formed from the resin composition RC according to an embodiment may show excellent peel strength.

An amount of the urethane (meth)acrylate oligomer may be in a range of about 5 wt % to about 20 wt %, based on a total weight of the resin composition RC. For example, if two or more types of the urethane (meth)acrylate oligomers are included in the resin composition RC, a total amount of the two or more types of the urethane (meth)acrylate oligomers included in the resin composition RC may be in a range of about 5 wt % to about 20 wt %, based on a total weight (100 wt %) of the resin composition RC.

If an amount of the urethane (meth)acrylate oligomer in the resin composition RC according to an embodiment is within the above-described range, the resin composition RC may have a suitable viscosity, and may readily discharge from the nozzle NZ. Accordingly, the adhesive member AP formed from the resin composition RC including the urethane (meth)acrylate oligomer in the range may have excellent adhesiveness and may be readily folded and unfolded. If an amount of the urethane (meth)acrylate oligomer in the resin composition RC is less than the above-described range, the viscosity of the resin composition RC may be excessively low, and the resin composition RC may not be applied at a uniform thickness and/or at a uniform amount. If an amount of the urethane (meth)acrylate oligomer in the resin composition RC is greater than the above-described range, the viscosity may be excessively high, discharge defects from the nozzle NZ may be generated, and a blockage may occur in the nozzle NZ.

In an embodiment, the resin composition RC may include at least one first monomer. The first monomer may not include a cationic polymerizable group but may include one (meth)acryloyl group per monomer unit. The cationic polymerizable group is not specifically limited but may include an epoxy group, an oxetanyl group, a vinyl ether group, or the like. In an embodiment, the first monomer may be a monofunctional (meth)acrylate monomer including one acryloyl group or one methacryloyl group.

In an embodiment, the weight-average molecular weight of the first monomer may be equal to or less than about 300 g/mol. For example, the weight-average molecular weight of the first monomer may be in a range of about 150 g/mol to about 300 g/mol. If the weight-average molecular weight of the first monomer is within the above-described range, the peel strength of the adhesive member AP formed from the resin composition RC may be excellent, and the discharge properties of the resin composition RC may be excellent.

For example, the first monomer may include iso-decyl acrylate, 4-hydroxybutyl acrylate, and/or tetrahydrofurfuryl acrylate (products of Kyocisha Chemical Co., Ltd). However, these are only examples, and embodiments are not limited thereto.

In an embodiment, a total amount of the urethane (meth) acrylate oligomer and the first monomer may be in a range of about 50 wt % to about 80 wt %, based on a total weight of the resin composition RC. If the total amount of the urethane (meth)acrylate oligomer and the first monomer in the resin composition RC is less than the above-described range, a radical curing component serving rapid reaction to ultraviolet (UV) light may be insufficient, and curing defects may arise. If the total amount of the urethane (meth)acrylate oligomer and the first monomer in the resin composition RC is greater than about 80 wt %, a cationic curing component may be insufficient, and the improvement of the adhesion strength of a cured product after the lapse of time after UV irradiation may be reduced. Accordingly, the adhesive member AP may have sufficient adhesion strength when a total amount of the urethane (meth)acrylate oligomer and the first monomer is within the range described above.

In an embodiment, the resin composition RC may include at least one second monomer. The second monomer may include one (meth)acryloyl group and one cationic polymerizable group per monomer unit. The second monomer may have a weight-average molecular weight equal to or less than about 300 g/mol. For example, the weight-average molecular weight of the second monomer may be in a range of about 150 g/mol to about 300 g/mol. If the weight-average molecular weight of the second monomer is within the range, the peel strength of the adhesive member AP formed from the resin composition RC may be excellent.

For example, the second monomer may include (3-ethyloxetane-3-yl)methyl acrylate and/or 3,4-epoxycyclohexylmethyl methacrylate. In the resin composition RC according to an embodiment, the second monomer may be included as a crosslinking agent. However, this is only an example, and embodiments are not limited thereto.

In an embodiment, an amount of the second monomer may be in a range of about 10 wt % to about 30 wt %, based on a total weight of the resin composition RC. If an amount of the second monomer in the resin composition RC is less than the above-described range, a crosslinking density may be reduced during forming the adhesive member AP, and curing defects may arise. If an amount of the second monomer in the resin composition RC is greater than the above-described range, relatively low peel strength may be shown, and the reliability of the adhesive member AP may be reduced.

In an embodiment, the resin composition RC may include at least one third monomer. The third monomer may not include a radical polymerizable group but may include one cationic polymerizable group per monomer unit. For example, the third monomer may include a (meth)acryloyl group as the radical polymerizable group, but embodiments are not limited thereto.

The weight-average molecular weight of the third monomer may be equal to or less than about 300 g/mol. For example, the weight-average molecular weight of the third monomer may be in a range of about 150 g/mol to about 300 g/mol. If the weight-average molecular weight of the third monomer is in the above-described range, the peel strength of the adhesive member AP formed from the resin composition RC may be excellent.

The third monomer may include a glycidyl group or an oxetane group. For example, the third monomer may include 2-ethyl hexyl glycidyl ether, 3-ethyl-3-(4-hydroxybutyloxymethyl)-oxetane, and/or 2-ethylhexyl oxetane. However, these are illustrations, and embodiments are not limited thereto.

In an embodiment, an amount of the third monomer may be in a range of about 10 wt % to about 20 wt %, based on a total weight of the resin composition RC. If an amount of the third monomer in the resin composition RC is within the above-described range, the adhesiveness of the adhesive member AP formed from the resin composition RC may be excellent. For example, if the resin composition RC includes the third monomer in the above-described range, the resin composition RC may be cured only with a single photocuring, and the adhesiveness of the adhesive member AP may be improved after the lapse of time after photocuring. If an amount of the third monomer in the resin composition RC is less than about 10 wt %, the reaction may be completed immediately after photocuring (for example, UV curing), and improvement of the adhesion strength of a cured product after the lapse of time may not be achieved. If an amount of the third monomer is greater than about 20 wt %, an unreacted component may remain significantly large after photocuring, and components of the resin composition RC may ooze out after attaching the adhesive member AP.

The resin composition RC according to an embodiment may include a photoinitiator. The photoinitiator may include a radical polymerization initiator. One or more types of the photoinitiators may be included in the resin composition RC. If the resin composition RC includes multiple photoinitiators, each photoinitiator may be activated by ultraviolet light having different central wavelengths.

For example, the photoinitiator may include at least one of 2,2-dimethoxy-1,2-diphenylethan-1-one, 1-hydroxy cyclohexyl-phenylketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one. The photoinitiator may include at least one of 2-methyl-1 [4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, ethyl(2,4,6-trimethylbenzoyl) phenyl phosphinate), phenylbis(2,4,6-trimethylbenzoyl) phosphine oxide, [1-(4-phenylsulfanylbenzoyl) heptylidencamino]benzoate, [1-[9-ethyl-6-(2-methylbenzoyl)carbazol-3-yl]ethylidencamino] acetate, and bis(2,4-cyclopentadienyl)bis[2,6-difluoro-3-(1-pyrryl)phenyl] titanium(IV). In an embodiment, the resin composition RC may include at least one of Omnirad 819 (IGM Resins Co.) and Omnirad 184 (IGM Resins Co.) as a photoinitiator. The Omnirad 819 (IGM Resins Co.) and Omnirad 184 (IGM Resins Co.) are radical polymerization initiators.

In an embodiment, the resin composition RC may include a photoacid generator. The photoacid generator may react with UV light to produce an acid. One type or two or more types of the photoacid generators may be included in the resin composition RC.

In an embodiment, the type of the photoacid generator is not specifically limited and may include a sulfonium salt. In an embodiment, the photoacid generator may include a triarylsulfonium salt. The amount of the photoacid generator may be in a range of about 0.1 wt % to about 1 wt % based on a total weight of the resin composition RC. However, this is only an example, and embodiments are not limited thereto.

The resin composition RC according to an embodiment may not substantially include an organic solvent. For example, an amount of an organic solvent may be less than about 1 wt %, based on a total weight of the resin composition RC. For example, the resin composition RC according to an embodiment may be a solvent-free type, and may not include a solvent. If the adhesive member AP is formed from the solvent-free type resin composition, a process for drying an organic solvent may be omitted from the process steps. For example, an additional drying process may be omitted after applying the resin composition RC on a display module DM or a window WP, and a continuous process may be possible for a long time, and thus, production efficiency and production quality may be improved.

FIG. 5B is a schematic cross-sectional view illustrating a step of providing ultraviolet light UV-L to a resin composition RC to form an adhesive member AP. Referring to FIG. 5B, a preliminary adhesive member P-AP formed by applying the resin composition RC at a certain thickness may be irradiated with ultraviolet light UV-L. FIG. 5B illustrates that the preliminary adhesive member P-AP is directly irradiated with ultraviolet light UV-L, but embodiments are not limited thereto. On the preliminary adhesive member P-AP, a carrier film (not shown) may be disposed, and the carrier film (not shown) may cover the preliminary adhesive member P-AP during a curing process. The carrier film (not shown) may transmit the ultraviolet light UV-L.

Referring to FIG. 5A and FIG. 5B, the ultraviolet light UV-L may be provided on the preliminary adhesive member P-AP in the presence of oxygen. The adhesive member AP (see FIG. 5C) may be formed by curing the resin composition RC in the presence of oxygen. In order to form the adhesive member AP from the resin composition RC, the ultraviolet light UV-L may be provided once. For example, the adhesive member AP (see FIG. 5C) may be formed by curing the resin composition RC through a single provision of the ultraviolet light UV-L.

FIG. 5C is a schematic cross-sectional view illustrating a step of detaching the adhesive member AP from the substrate CF. In FIG. 5C, the detaching of the adhesive member AP that is formed by providing ultraviolet light UV-L (see FIG. 5B) to the preliminary adhesive member P-AP (see FIG. 5B) from a substrate CF is shown.

The detached adhesive member AP may be provided on a surface of the window WP (see FIG. 4) or on a surface of the display module DM (see FIG. 4). A surface of the adhesive member AP may be laminated on a surface of the window WP (see FIG. 4) or on a surface of the display module DM (see FIG. 4), and, a surface of the display module DM (see FIG. 4) or a surface of the window WP (see FIG. 4) may be attached to the other surface of the adhesive member AP that is not attached.

Figure 6A:
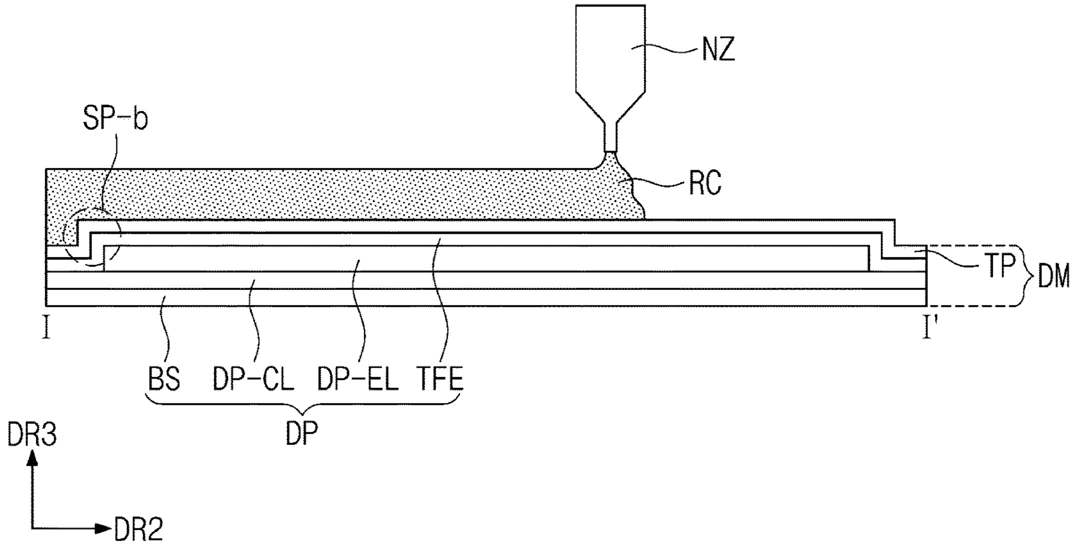
FIG. 6A and FIG. 6B are each a schematic cross-sectional view showing steps of a method for manufacturing an adhesive member according to an embodiment.
Figure 6B:
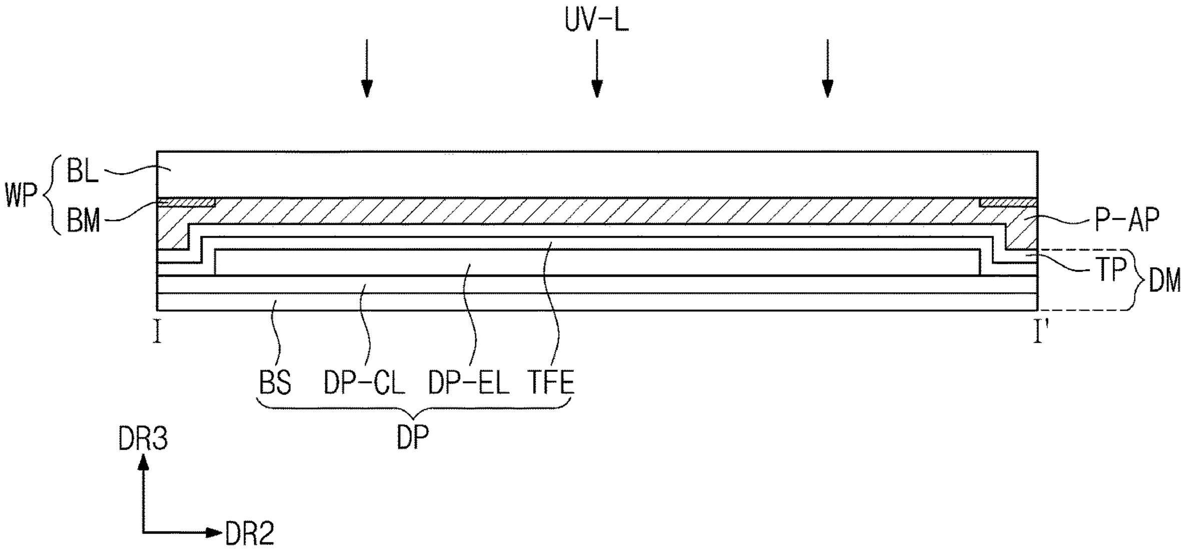

FIG. 6A and FIG. 6B are each a schematic cross-sectional view showing the steps of a method for manufacturing an adhesive member AP according to an embodiment.

FIG. 6A and FIG. 6B are cross-sectional views for explaining a forming method that is different from the method of forming the adhesive member AP explained referring to FIG. 5A to FIG. 5C. In the description of FIG. 6A and FIG. 6B, the features which have been described above with reference to FIGS. 1 to 5C will not be described again, but the differing features will be described.

Referring to FIG. 6A, the resin composition RC may be provided directly on a surface of the display module DM or on a surface of the window WP (FIG. 6B). In FIG. 6A, the resin composition RC is provided directly on one surface of the display module DM. The resin composition RC that has a viscosity in a range of less than about 5 mPa·s measured by a JIS K 2283 at a temperature of about 30° C. may be provided to cover a step SP-b portion in the display module DM.

Referring to FIG. 6B, a window WP may be provided on the preliminary adhesive member P-AP that is formed by applying the resin composition RC at a constant thickness. Ultraviolet light UV-L may be provided on the preliminary adhesive member P-AP. The ultraviolet light UV-L may pass through the window WP and be provided on the preliminary adhesive member P-AP. The preliminary adhesive member P-AP may be cured to form an adhesive member AP (FIG. 4).

In another embodiment, the preliminary adhesive member P-AP may be directly irradiated with the ultraviolet light UV-L to form the adhesive member AP (FIG. 4). The adhesive member AP may be formed, and the window WP may be provided on the formed adhesive member AP (FIG. 4).

Referring to FIG. 5A to FIG. 6B, the adhesive member AP may be formed by curing the resin composition RC by a single irradiation of ultraviolet light UV-L in the presence of oxygen. The resin composition RC may show adhesiveness and may be cured in an aligned state with a substrate CF or a display module DM without the collapse in an applied state of the resin composition RC provided on the substrate CF or the display module DM immediately after curing by the irradiation of ultraviolet light UV-L. For example, the resin composition RC may show adhesiveness without dislocation from the contacting position of the resin composition RC with the substrate CF or the display module DM immediately after a single photocuring. In an embodiment, the resin composition RC may show improved adhesiveness after the lapse of time after a single photocuring. For example, the adhesive member AP formed from the resin composition RC according to an embodiment may show equal to or greater than about 100% of a peel strength time change ratio according to Equation 1 and may show excellent adhesion reliability.

$$\text{Peel strength time change ratio}\,(\%) = (P2 - P1) \div P1 \times 100 \quad \text{[Equation 1]}$$

In Equation 1, P1 is a measured value of a 180° of cured resin composition peel strength, with respect to a polyethylene terephthalate (PET) film or a glass substrate, at about 25° C., immediately after photocuring the resin composition RC. P2 is a measured value of a 180° peel strength of cured resin composition, with respect to a polyethylene terephthalate (PET) film or a glass substrate, at about 25° C., after 1 hour from photocuring the resin composition RC.

The resin composition RC according to an embodiment may complete the curing by only with a single photocuring in the presence of oxygen and may form an adhesive member AP having excellent adhesion reliability. For example, in an embodiment, the adhesive member AP may show excellent peel strength without detaching at an interface thereof even when it has been photocured in the presence of oxygen.

Figure 7:
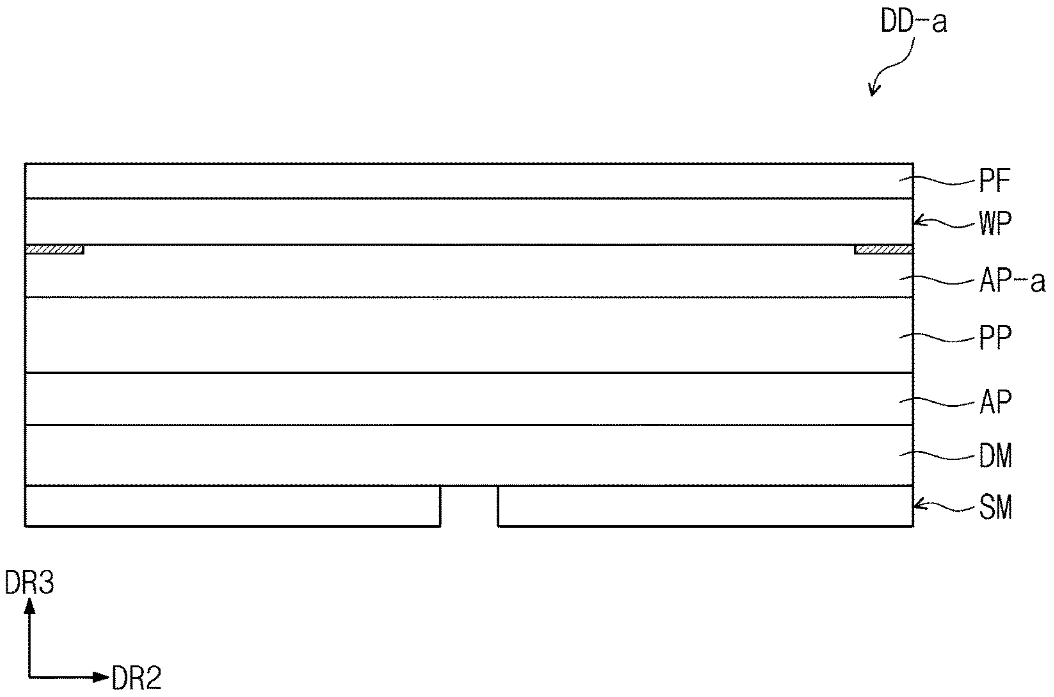
FIG. 7 is a schematic cross-sectional view of a display device according to an embodiment.

FIG. 7 is a schematic cross-sectional view of a display device DD-a according to an embodiment.

In the description of the display device DD-a shown in FIG. 7, the features which have been described above with reference to FIG. 1 to FIG. 6B will not be described again, and the differing features will be described.

Compared to the display device DD explained referring to FIG. 3 and FIG. 4, a display device DD-a shown in FIG. 7 may further include a light controlling layer PP and an optical adhesive layer AP-a. The light controlling layer PP according to an embodiment may be disposed between the adhesive member AP and the window WP. The optical adhesive layer AP-a according to an embodiment may be disposed between the light controlling layer PP and the window WP.

The light controlling layer PP may be disposed on the display panel DP and control reflecting light at the display panel DP by external light. The light controlling layer PP may include, for example, a polarization plate or a color filter layer.

The optical adhesive layer AP-a may be formed from the resin composition RC according to an embodiment. The optical adhesive layer AP-a may include a polymer derived from the resin composition RC according to an embodiment. The optical adhesive layer AP-a including the polymer derived from the resin composition RC may have a 180° peel strength equal to or greater than about 400 gf/25 mm, with respect to a glass substrate or a polyethylene terephthalate (PET) film, at a temperature of about 25° C., immediately after photocuring. The optical adhesive layer AP-a including the polymer derived from the resin composition RC may have the peel strength time change ratio, according to Equation 1, equal to or greater than about 100%. Accordingly, the optical adhesive layer AP-a including the polymer derived from the resin composition RC according to an embodiment may have high adhesion properties and flexibility, may not detach at an interface with the optical adhesive layer AP-a even when the display device DD-a is folded or bent, and may show excellent adhesion reliability and excellent folding reliability.

The display device DD-a according to an embodiment may include an optical adhesive layer AP-a and an adhesive member AP, including a polymer derived from the resin composition RC according to an embodiment, and the display device DD-a including the optical adhesive layer AP-a and the adhesive member AP may show excellent reliability during operation such as folding.

Figure 8:
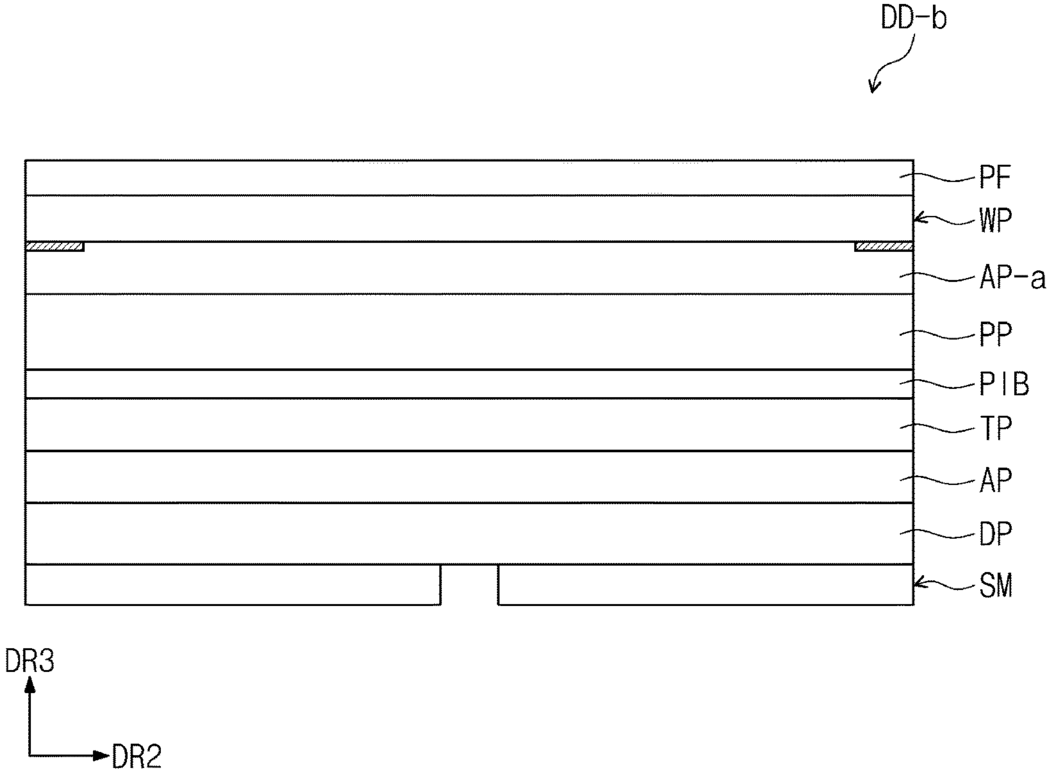
FIG. 8 is a schematic cross-sectional view of a display device according to an embodiment.

FIG. 8 is a schematic cross-sectional view of a display device DD-b according to an embodiment.

In the description of display device DD-b according to an embodiment, shown in FIG. 8, the features which have been described above with reference to FIG. 1 to FIG. 7 will not be described again, and differing features will be explained mainly.

Compared to the display device DD explained referring to FIG. 3 and FIG. 4, a display device DD-b shown in FIG. 8 may further include a light controlling layer PP, an optical adhesive layer AP-a, and an interlayer adhesive layer PIB. The light controlling layer PP according to an embodiment may be disposed between the adhesive member AP and the window WP. An optical adhesive layer AP-a according to an embodiment may be disposed between the light controlling layer PP and the window WP.

In the display device DD-b according to an embodiment, the adhesive member AP may be disposed between the display panel DP and an input sensing part TP. For example, the input sensing part TP may not be disposed directly on the display panel DP, but the display panel DP and the input sensing part TP may be combined by the adhesive member AP. For example, the adhesive member AP may be disposed between the encapsulation layer TFE (see FIG. 4) of the display panel DP and the input sensing part TP.

Under the light controlling layer PP, an interlayer adhesive layer PIB may be provided. The interlayer adhesive layer PIB may be disposed between the input sensing part TP and the light controlling layer PP and may be formed from an adhesive material having excellent prevention of moisture permeation. For example, the interlayer adhesive layer PIB may include polyisobutylene. The interlayer adhesive layer PIB may be disposed on the input sensing part TP and prevent the corrosion of the sensing electrodes of the input sensing part TP.

The display device DD-b according to an embodiment may include the optical adhesive layer AP-a and the adhesive member AP, including a polymer derived from the resin composition RC according to an embodiment, and the display device DD-b including the optical adhesive layer AP-a and the adhesive member AP may show excellent reliability during operation such as folding.

Hereinafter, an adhesive member formed from a resin composition and a display device according to an embodiment will be explained in detail with reference to the Examples and the Comparative Examples. The embodiments below are only provided as illustrations to assist in understanding the disclosure, and the scope thereof is not limited thereto.

EXAMPLES

1. Preparation of Resin Compositions

The resin compositions of the Examples and Comparative Examples were prepared by the mixing ratios shown in Tables 1 and 2. The materials were put in a light-shielding container by the weights (g) shown in Table 1 and Table 2, stirred at about 1000 rpm for about 30 minutes using a rotary agitation deaerator (a product of SHASHIN KAGAKU) to prepare the resin compositions of the Examples and Comparative Examples.

TABLE 1

| Material | | Weight-average molecular weight | Example 1 | Example 2 | Example 3 | Example 4 |
|---|---|---|---|---|---|---|
| Urethane | UV-3700B | 38,000 | 3 | 5 | 5 | 9 |
| (meth)acrylate oligomer | UV-3300B | 13,000 | 3 | 5 | 5 | 9 |
| First monomer | IDAA | 212 | 44 | 30 | 30 | 30 |
| | 4-HBA | 255 | | 30 | 20 | 15 |
| | Light acrylate THF-A | 156 | | | | 15 |
| Second monomer | OXE-10 | 170 | 28 | 10 | 10 | 10 |
| | Cyclomer M100 | 196 | | 8 | 10 | |
| Third monomer | OXT-212 | 226 | 10 | 10 | | 5 |
| | Denacol EX-121 | 186 | | | 10 | |
| | ETERNACOLL HBOX | 188 | 10 | | 8 | 5 |

TABLE 1-continued

| Material | | Weight-average molecular weight | Example 1 | Example 2 | Example 3 | Example 4 |
|---|---|---|---|---|---|---|
| Photoinitiator | Omnirad 819 | 418 | 1.5 | 1.5 | 1.5 | 1.5 |
| Photoacid generator | CPI-110 | — | 0.5 | 0.5 | 0.5 | 0.5 |

TABLE 2

| Material | | Weight-average molecular weight | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Urethane (meth)acrylate oligomer | UV-3700B | 38,000 | 12 | 5 | 5 | 5 | 2 | 5 | 5 |
| | UV-3300B | 13,000 | 12 | 5 | 5 | 5 | 2 | 5 | 5 |
| First monomer | IDAA | 212 | 10 | 15 | 30 | 20 | 30 | 30 | 30 |
| | 4-HBA | 255 | | 15 | 30 | 20 | 15 | 20 | 15 |
| | Light acrylate THF-A | 156 | 20 | | | | 15 | 20 | 15 |
| Second monomer | OXE-10 | 170 | 24 | 10 | | 20 | 20 | 10 | 9 |
| | Cyclomer M100 | 196 | | 8 | | 20 | | | |
| Third monomer | OXT-212 | 226 | 10 | 20 | 18 | | 10 | 4 | 10 |
| | Denacol EX-121 | 186 | | 20 | | | | | |
| | ETERNACOLL HBOX | 188 | 10 | | 10 | 8 | 4 | 4 | 9 |
| Photoinitiator | Omnirad 819 | 418 | 1.5 | 1.5 | 1.5 | 1.5 | 1.5 | 1.5 | 1.5 |
| Photoacid generator | CPI-110 | — | 0.5 | 0.5 | 0.5 | 0.5 | 0.5 | 0.5 | 0.5 |

<Data on the Materials in Tables 1 and 2>

UV-3700B: urethane acrylate (a product of Mitsubishi Chemical Inc.)

UV-3300B: urethane acrylate (a product of Mitsubishi Chemical Inc.)

IDAA: iso-decyl acrylate (a product of Osaka Organic Chemical Industry Ltd)

4-HBA: 4-hydroxybutyl acrylate (a product of Osaka Organic Chemical Industry Ltd)

Light acrylate THF-A: tetrahydrofurfuryl acrylate (a product of Kyoeisha Chemical Co., Ltd)

OXE-10: (3-ethyloxetane-3-yl)methyl acrylate (a product of Osaka Organic Chemical Industry Ltd)

Cyclomer M100: 3,4-epoxycyclohexylmethyl methacrylate (a product of Daicel Corporation)

Denacol EX-121: 2-ethyl hexyl glycidyl ether (a product of Nagase ChemteX Corporation)

ETERNACOLL HBOX: 3-ethyl-3-(4-hydroxybutyloxymethyl)oxetane (a product of UBE Corporation)

OXT-212: 2-ethylhexyl oxetane (a product of TOAGOSEI CO., LTD)

Omnirad 819: phenylbis(2,4,6-trimethylbenzoyl)phosphine oxide (a product of IGM Resins Co)

CPI-110B: triarylsulfonium salt (a product of San-Apro Ltd.)

2. Evaluation of Resin Compositions and Adhesive Members

In Tables 3 and 4 below, the viscosity and coatability of the resin compositions of the Examples and Comparative Examples, and the 180° peel strength of the cured products of the resin compositions are evaluated and shown.

<Measurement of Viscosity of Resin Composition>

The viscosity of a resin composition at a temperature of about 30° C. was measured based on JIS K 2283. The viscosity of the resin composition was measured under speed conditions of about 50 rpm using a viscometer TVE-25L (a product of TOKI SANGYO Co., Ltd.).

<Coatability of Resin Composition (Providing Resin Composition to Inkjet Printing)>

The coatability of the resin composition corresponds to the evaluation results of the appearance of a cured product after coating a resin composition through an inkjet printer and curing. The resin composition was applied using an inkjet printer (a product of MICROJET Co.) on a soda-lime glass (a product of Central Glass Co., Ltd.) at about 30° C. to a thickness of about 200 μm. The applied resin composition was irradiated with ultraviolet light to cure, and the appearance of the cured product (for example, an adhesive member) after curing was observed with the naked eye. In Tables 3 and 4, a case where the resin composition was stably discharged and applied at a uniform thickness was designated by "◎", and a case where the discharge of the resin composition from an inkjet printer was impossible was designated by "X".

<180° Peel Strength of Adhesive Member>

The resin composition prepared was applied on a soda-lime glass (a product of Central Glass Co., Ltd.) using an inkjet printer (a product of MICROJET Co.) to a thickness of about 50 μm. The resin composition was irradiated with ultraviolet light using UV-LED lamps having peaks of about 405 nm and about 365 nm such that the total dosages of ultraviolet light were about 220 mJ/cm$^2$ and about 380 mJ/cm$^2$, respectively to form a preliminary adhesive member. On the preliminary adhesive member, a PET film (a product of TOYOBO Co., Ltd., a product name of A4360, a thickness of about 50 μm) was attached to obtain an adhesive member (a sample). The 180° peel strength of the sample was measured using a Universal testing Machine (Instron Corporation, product of 5965 type). The 180° peel strength was measured at a temperature of about 25° C. with a tensile rate of about 300 mm/min.

In Table 3 and Table 4, the 180° peel strength [gf/25 mm] immediately after UV curing corresponds to the measured results of the 180° peel strength [gf/25 mm] with respect to a PET film or a soda-lime glass immediately after UV curing, and are results measured immediately after attaching a PET film on the preliminary adhesive member. The 180° peel strength [gf/25 mm] after 1 hour corresponds to the measured results of the 180° peel strength [gf/25 mm] with respect to a PET film or a soda-lime glass after 1 hour from the attachment of a PET film on the preliminary adhesive member. The peel strength time change ratio was calculated by Equation 1.

The adhesive member formed from the resin composition of Comparative Example 2 has a low 180° peel strength immediately after photocuring, and there are problems of dislocation during attaching a PET film on the preliminarily cured resin composition. It is thought that such results are obtained, because the total amount of the urethane (meth) acrylate oligomer and the first monomer included in the resin composition is less than about 50 wt %, and a radical curing component that rapidly reacts by ultraviolet light is insufficient, thereby arising curing defects.

It was confirmed that the resin composition of Comparative Example 3 remained in a gel state even after photocuring and was not attached to a PET film. It is thought that such results are obtained, because the resin composition did not include the second monomer according to an embodiment, and crosslinking bonds are not formed, thereby arising curing defects.

TABLE 3

| | Example 1 | Example 2 | Example 3 | Example 4 |
|---|---|---|---|---|
| Viscosity at 30° C. [mPa · s] | 6 | 11 | 12 | 19 |
| Application by inkjet printer at 30° C. | ◎ | ◎ | ◎ | ◎ |
| 180° peel strength immediately after UV curing [gf/25 mm] | 320 | 460 | 570 | 610 |
| 180° peel strength after 1 hour [gf/25 mm] | 1110 | 1250 | 1290 | 1250 |
| Peel strength time change ratio [%] | 247 | 172 | 126 | 105 |

TABLE 4

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Viscosity at 30° C. [mPa · s] | 38 | 10 | 15 | 17 | 4 | 18 | 15 |
| Application by inkjet printer at 30° C. | X | ◎ | ◎ | ◎ | X | ◎ | ◎ |
| 180° peel strength immediately after UV curing [gf/25 mm] | 550 | 150 | Unevaluatable | 760 | 440 | 820 | 260 |
| 180° peel strength after 1 hour [gf/25 mm] | 1520 | 750 | Unevaluatable | 800 | 1020 | 1020 | 350 |
| Peel strength time change ratio [%] | 176 | 400 | Unevaluatable | 5 | 132 | 24 | 25 |

Referring to Table 3, the resin compositions of Example 1 to Example 4 have viscosities in a range of about 5 mPa·s to about 20 mPa·s measured by JIS K 2283 at a temperature of about 30° C. It could be confirmed that if the resin compositions having viscosities in a range of about 5 mPa·s to about 20 mPa·s are used, adhesive members may be formed at a uniform thickness at a temperature of about 30° C. by an inkjet printing method.

The adhesive members formed from the resin compositions of Examples 1 to 4 have the 180° peel strength equal to or greater than about 400 gf/25 mm, immediately after UV photocuring. It could be found that the adhesive members formed from the resin compositions according to embodiments show excellent adhesion properties without dislocation during attaching a PET on a preliminarily cured resin composition. It could also be found that the adhesive members formed from the resin compositions of Examples 1 to 4 show peel strength time change ratios that are equal to or greater than about 100% and markedly improved adhesiveness.

Referring to Table 4, the resin composition of Comparative Example 1 includes a urethane (meth)acrylate oligomer in an amount equal to or greater than about 20 wt %, and the viscosity measured based on JIS K 2283 at a temperature of about 30° C. is equal to or greater than about 20 mPa·s. The resin composition of Comparative Example 1 shows a high viscosity that is equal to or greater than about 20 mPa·s, and it could be confirmed that discharge from an inkjet printer is bad.

The adhesive member formed from the resin composition of Comparative Example 4 shows a very low peel strength time change ratio of about 5%, and its adhesiveness after the lapse of time is not improved. From such results, it could be thought that the second monomer according to an embodiment was included in an amount equal to or greater than about 30 wt %, and curing was nearly completed immediately after photocuring. Accordingly, it was confirmed that curing with a time gap was not performed, the improvement of adhesiveness was not obtained, and bubbling mixing occurred during attaching a PET film.

For the resin composition of Comparative Example 5, discharge defects occurred during discharging using an inkjet printer. It is thought that such results were obtained, because the amount of the urethane (meth)acrylate oligomer was only about 4 wt %, and the viscosity was reduced much to about 4 mPa·s.

For the resin composition of Comparative Example 6, the peel strength time change ratio was about 24% and very low, and the adhesiveness after the lapse of time was rarely improved. It is thought that such results were obtained, because the total amount of the urethane (meth)acrylate oligomer and the first monomer was about 80 wt %, and the amount of the cationic polymerization component was reduced. Accordingly, the curing was nearly completed immediately after photocuring, the improvement of adhesiveness after the lapse of time was reduced, and bubble mixing occurred during attaching a PET film.

For the resin composition of Comparative Example 7, the peel strength time change ratio was about 25% and very low, and the adhesiveness after the lapse of time was rarely improved. The adhesiveness immediately after UV curing was small, and the cured product had a gel state. It is thought that such results were obtained, because the amount of the second monomer was about 9% and small, and crosslinking bonds were not formed between the cationic polymerizable component and the radical polymerizable component, thereby arising curing defects. Accordingly, it is thought that the adhesiveness after UV curing was low, and the improvement of the adhesiveness after the lapse of time was reduced.

The resin composition according to an embodiment has excellent discharge stability, and an adhesive member may be formed through a process like an inkjet printing method at room temperature. The adhesive member according to an embodiment uses the resin composition according to an embodiment and may show excellent adhesion strength only with a single photocuring.

The display device according to an embodiment includes the adhesive member formed from the resin composition and may show excellent durability.

Embodiments have been disclosed herein, and although terms are employed, they are used and are to be interpreted in a generic and descriptive sense only and not for the purposes of limitation. In some instances, as would be apparent to one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the claims.

What is claimed is:

1. A resin composition comprising:

a urethane (meth)acrylate oligomer comprising two to four (meth)acryloyl groups;

a first monomer not comprising a cationic polymerizable group but comprising one (meth)acryloyl group per monomer unit; and a second monomer comprising one (meth)acryloyl group and one cationic polymerizable group per monomer unit, wherein an amount of the urethane (meth)acrylate oligomer is in a range of about 5 wt % to about 20 wt %, based on a total weight of the resin composition, an amount of the second monomer is in a range of about 10 wt % to about 30 wt %, based on a total weight of the resin composition, and a total amount of the urethane (meth)acrylate oligomer and the first monomer is in a range of about 50 wt % to about 80 wt %, based on a total weight of the resin composition.

2. The resin composition of claim 1, further comprising at least one of a third monomer not comprising a radical polymerizable group but comprising one cationic polymerizable group per monomer unit, a photoinitiator, and a photoacid generator.

3. The resin composition of claim 2, wherein a weight-average molecular weight of the third monomer is in a range of about 150 g/mol to about 300 g/mol.

4. The resin composition of claim 2, wherein the photoinitiator comprises a radical polymerization initiator.

5. The resin composition of claim 2, wherein the photoacid generator comprises a sulfonium salt.

6. The resin composition of claim 2, wherein the resin composition further comprises:

the third monomer;

the photoinitiator; and the photoacid generator, and an amount of the third monomer is in a range of about 10 wt % to about 20 wt %, based on a total weight of the resin composition.

7. The resin composition of claim 1, wherein a weight-average molecular weight of the urethane (meth)acrylate oligomer is in a range of about 10,000 g/mol to about 40,000 g/mol.

8. The resin composition of claim 1, wherein a viscosity of the resin composition at about 30° C. is in a range of about 5 mPa·s to about 20 mPa·s.

9. The resin composition of claim 1, wherein a weight-average molecular weight of the first monomer and a weight-average molecular weight of the second monomer are each independently in a range of about 150 g/mol to about 300 g/mol.

10. The resin composition of claim 1, wherein a 180° peel strength of the resin composition is equal to or greater than about 400 gf/25 mm, with respect to each of a polyethylene terephthalate (PET) film and a glass substrate at about 25° C., immediately after photocuring in the presence of oxygen.

11. The resin composition of claim 1, wherein the resin composition does not comprise an organic solvent.

12. An adhesive member comprising a polymer derived from a resin composition, wherein the resin composition comprises:

a urethane (meth)acrylate oligomer comprising two to four (meth)acryloyl groups;

a first monomer not comprising a cationic polymerizable group but comprising one (meth)acryloyl group per monomer unit; and a second monomer comprising one (meth)acryloyl group and one cationic polymerizable group per monomer unit, a total amount of the urethane (meth)acrylate oligomer and the first monomer is in a range of about 50 wt % to about 80 wt %, based on a total weight of the resin composition, and a peel strength time change ratio according to Equation 1 is equal to or greater than about 100%:

$$\text{peel strength time change ratio (\%)} = (P2 - P1) \div P1 \times 100 \quad \text{[Equation 1]}$$

wherein in Equation 1,

P1 is a measured value of a 180° peel strength with respect to a polyethylene terephthalate (PET) film or a glass substrate at about 25° C., immediately after photocuring the resin composition, and P2 is a measured value of a 180° peel strength with respect to a polyethylene terephthalate (PET) film or a glass substrate at about 25° C., after 1 hour from photocuring the resin composition.

13. The adhesive member of claim 12, wherein an amount of the urethane (meth)acrylate oligomer is in a range of about 5 wt % to about 20 wt %, based on a total weight of the resin composition.

14. The adhesive member of claim 12, wherein an amount of the second monomer is in a range of about 10 wt % to about 30 wt %, based on a total weight of the resin composition.

15. The adhesive member of claim 12, wherein the resin composition further comprises:

a third monomer not comprising a radical polymerizable group but comprising one cationic polymerizable group per monomer unit;

a photoinitiator; and a photoacid generator.

16. The adhesive member of claim 12, wherein P1 is equal to or greater than about 400 gf/25 mm.

17. A display device comprising:

a display panel;

a window disposed on the display panel; and an adhesive member disposed between the display panel and the window and comprising a polymer derived from a resin composition, wherein the resin composition comprises:

a urethane (meth)acrylate oligomer comprising two to four (meth)acryloyl groups;

a first monomer not comprising a cationic polymerizable group but comprising one (meth)acryloyl group per monomer unit;

a second monomer comprising one (meth)acryloyl group and one cationic polymerizable group per monomer unit;

a third monomer not comprising a radical polymerizable group but comprising one cationic polymerizable group per monomer unit;

a photoinitiator; and a photoacid generator, wherein an amount of the urethane (meth)acrylate oligomer is in a range of about 5 wt % to about 20 wt %, based on a total weight of the resin composition, an amount of the second monomer is in a range of about 10 wt % to about 30 wt %, based on a total weight of the resin composition, and a total amount of the urethane (meth)acrylate oligomer and the first monomer is in a range of about 50 wt % to about 80 wt %, based on a total weight of the resin composition.

18. The display device of claim 17, wherein the adhesive member has a peel strength time change ratio according to Equation 1 equal to or greater than about 100%:

$$\text{peel strength time change ratio}(\%) = (P2 - P1) \div P1 \times 100 \quad \text{[Equation 1]}$$

wherein in Equation 1,

P1 is a measured value of a 180° peel strength with respect to a polyethylene terephthalate (PET) film or a glass substrate at about 25° C., immediately after photocuring the resin composition, and P2 is a measured value of a 180° peel strength with respect to a polyethylene terephthalate (PET) film or a glass substrate at about 25° C. after 1 hour from photocuring the resin composition.

19. The display device of claim 17, further comprising:

a light controlling layer disposed between the adhesive member and the window; and an optical adhesive layer disposed between the light controlling layer and the window, wherein the optical adhesive layer comprises a polymer derived from the resin composition.

* * * * *